(12) United States Patent
Ariyama

(10) Patent No.: US 6,868,455 B1
(45) Date of Patent: Mar. 15, 2005

(54) INFORMATION PROCESSING APPARATUS, INFORMATION PROCESSING METHOD AND COMPUTER READABLE MEDIUM

(75) Inventor: Kota Ariyama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/421,005

(22) Filed: Oct. 20, 1999

(30) Foreign Application Priority Data

Oct. 28, 1998 (JP) .......................................... 10-307278

(51) Int. Cl.⁷ .............................................. G06F 3/00
(52) U.S. Cl. ....................................... 710/8; 709/203
(58) Field of Search ...................... 710/8, 11; 709/203, 709/205; 358/1.15

(56) References Cited

U.S. PATENT DOCUMENTS

| | | | | |
|---|---|---|---|---|
| 5,197,128 A | * | 3/1993 | Campbell et al. ............. | 710/56 |
| 5,228,118 A | * | 7/1993 | Sasaki ....................... | 358/1.13 |
| 5,481,742 A | * | 1/1996 | Worley et al. ............... | 358/1.1 |
| 5,580,177 A | * | 12/1996 | Gase et al. .................. | 400/61 |
| 5,621,894 A | * | 4/1997 | Menezes et al. ............. | 358/406 |
| 5,644,720 A | * | 7/1997 | Boll et al. .................. | 709/225 |
| 5,727,220 A | * | 3/1998 | Hohensee et al. ............ | 345/764 |
| 5,761,399 A | * | 6/1998 | Asano ....................... | 358/1.15 |
| 5,881,240 A | * | 3/1999 | Asano ....................... | 379/93.33 |
| 5,987,228 A | * | 11/1999 | Nishizawa .................. | 358/1.15 |
| 5,991,846 A | * | 11/1999 | Ooki .......................... | 710/241 |
| 6,003,069 A | * | 12/1999 | Cavill ........................ | 709/205 |
| 6,044,408 A | * | 3/2000 | Engstrom et al. ........... | 709/328 |
| 6,088,120 A | * | 7/2000 | Shibusawa et al. ......... | 358/1.15 |
| 6,094,679 A | * | 7/2000 | Teng et al. .................. | 709/220 |
| 6,115,471 A | * | 9/2000 | Oki et al. ................... | 380/242 |
| 6,166,826 A | * | 12/2000 | Yokoyama .................. | 358/1.16 |
| 6,178,199 B1 | * | 1/2001 | Miller ........................ | 375/222 |
| 6,275,869 B1 | * | 8/2001 | Sieffert et al. .............. | 709/229 |
| 6,304,894 B1 | * | 10/2001 | Nakayama et al. .......... | 709/202 |
| 6,304,926 B1 | * | 10/2001 | Itezono ....................... | 710/63 |
| 6,321,348 B1 | * | 11/2001 | Kobata ....................... | 714/37 |
| 6,335,795 B1 | * | 1/2002 | Neuhard et al. ............ | 358/1.15 |
| 6,452,692 B1 | * | 9/2002 | Yacoub ...................... | 358/1.15 |
| 2001/0042140 A1 | * | 11/2001 | Calder et al. ............... | 709/328 |

* cited by examiner

*Primary Examiner*—Paul R. Myers
(74) *Attorney, Agent, or Firm*—Staas & Halsey LLP

(57) ABSTRACT

An information processing apparatus is provided, to which apparatus an operating apparatus and an apparatus to be operated by the operating apparatus are connected, the information processing apparatus including an instruction information storing part and an instruction information send part. The instruction information storing part stores instruction information for the apparatus to be operated. The instruction information send part reads the instruction information from the instruction information storing part in response to a request from the operating apparatus and sends the instruction information to the operating apparatus.

14 Claims, 7 Drawing Sheets

F I G. 4
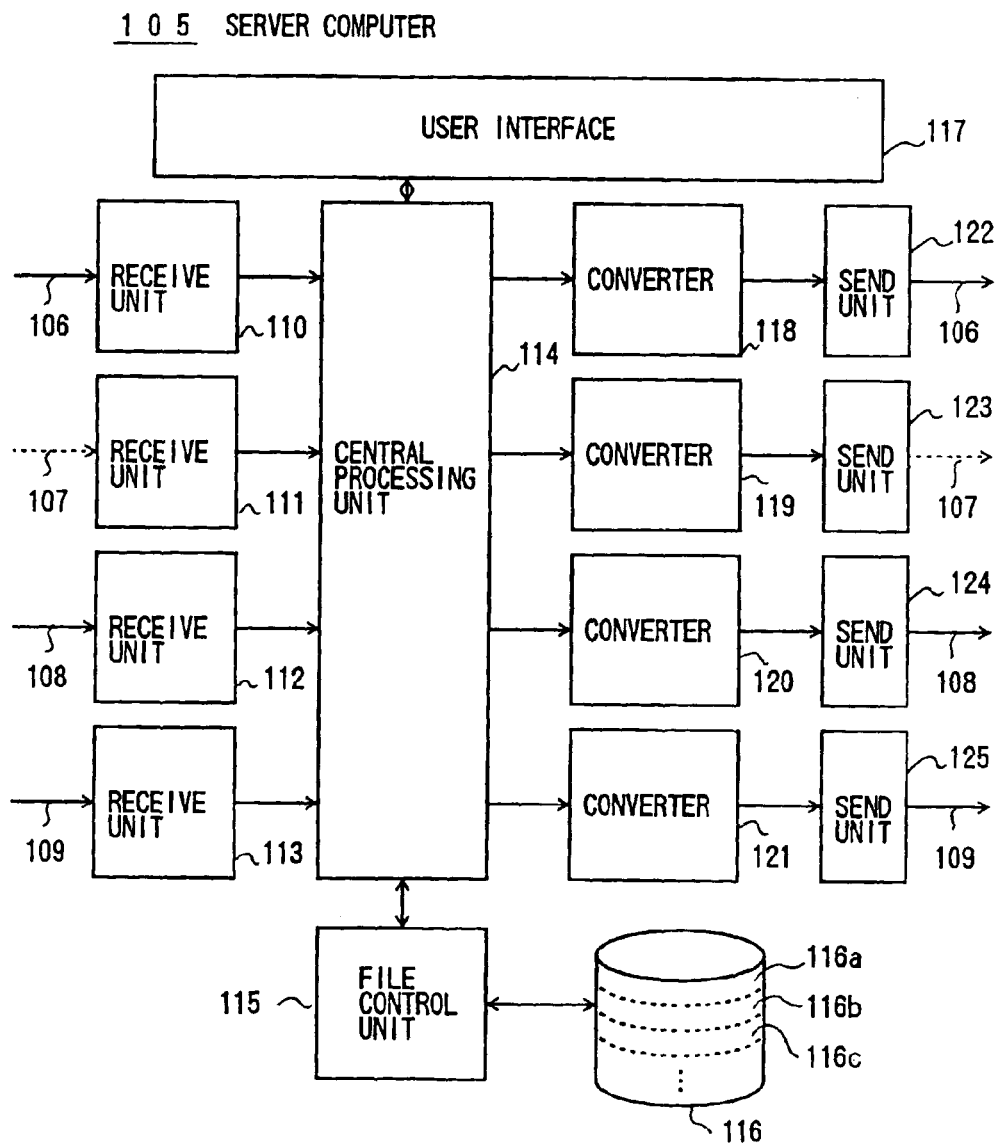

INFORMATION PROCESSING APPARATUS, INFORMATION PROCESSING METHOD AND COMPUTER READABLE MEDIUM

BACKGROUND OF THE INVENTION

1. Field of the Invention

The present invention generally relates to an information processing apparatus, an information processing method and a computer readable medium, and more particularly to an information processing apparatus, an information processing method, and a computer readable medium for operating, by a client apparatus, an apparatus to be operated which apparatus is managed by a server apparatus.

There is a system in which a peripheral apparatus such as a printer and the like is operated from a remote computer via a network. Recently, since the period of improvement of the peripheral apparatus is becoming shorter, frequency for removing or adding the peripheral apparatus to the system is increasing. Therefore, a configuration in which adding or removing an apparatus is easily carried out is needed for the system.

2. Description of the Related Art

FIG. 1 is a diagram for explaining an example of a conventional information processing system 1. The conventional information processing system 1 is configured such that a client computer 2 is connected to a server computer 4 and printers 5, 6 through a network 3.

The client computer 2 operates the server computer 4 and the printers 5, 6 by sending commands to each of the server computer 4 and the printers 5, 6. As shown in FIG. 1, the commands are sent directly to the server computer 4 and the printers 5, 6 through the network 3 from the client computer 2.

Therefore, the client computer 2 needs to have a command list for operating the server computer 4 and a command list for operating the printers 5, 6 separately when the server computer 4 and the printers 5, 6 are operated by different commands.

FIG. 2 is a diagram for explaining another example of a conventional information processing system 7. In FIG. 2, the same components have the same symbols as shown in FIG. 1, and descriptions of the components will be omitted.

The information processing system 7 shown in FIG. 2 is configured such that a client terminal 9 for example, other than the client computer 2, can operate the server computer 4 and the printers 5, 6 through a wireless line 8.

In this case, the client terminal 9 needs to have command lists for operating the server computer 4 and the printers 5, 6 in the same way as the client computer 4. Further, each of the server computer 4 and the printers 5, 6 needs to have a wireless communication device since the wireless line 8 is used for sending commands from the client terminal 9 to the server computer 4 and the printers 5, 6.

However, according to the information processing systems 1, 7, since the command lists for the server computer 4 and the printers 5, 6 are necessary for operating the server computer 4 and the printer 5, 6 from the client computer 2 and the client terminal 9, the command lists in the client computer 2 and the client terminal 9 should be updated in the case of, for example, losing compatibility between versions of commands after updating the server computer 4 and the printers 5, 6, and in the case of operating a new device. There is a problem that updating the command lists of the client computer 2 and the client terminal 9 takes time and effort.

Further, when the client terminal 9 which uses a communication type different from that of the client computer 2 is connected, as shown in FIG. 2, each apparatus to be operated needs to have a communication device for communicating with the client computer 2 and a communication device for communicating with the client terminal 9. Therefore, the configurations of the apparatuses to be operated such as the server computer 4, the printers 5, 6, and the like become complicated.

SUMMARY OF THE INVENTION

It is an object of the present invention to provide an information processing apparatus, information processing method and computer readable medium which can easily support different communication types.

The above object of the present invention is achieved by an information processing apparatus to which an operating apparatus and an apparatus to be operated by the operating apparatus are connected, the information processing apparatus including:

an instruction information storing part which stores instruction information for the apparatus to be operated; and an instruction information send part which reads the instruction information from the instruction information storing part in response to a request from the operating apparatus and sends the instruction information to the operating apparatus.

According to the above-mentioned invention, the information processing apparatus such as a server computer stores instruction information of an apparatus to be operated such as a command list and sends the instruction information to the operating apparatus according to a request from the operating apparatus. Therefore, the operating apparatus does not need to store the command list of the apparatus to be operated. Since the information processing apparatus manages the command lists, an apparatus to be operated can be added only by adding a command list to the information processing apparatus. Thus, it becomes easy to add and update an apparatus to be operated.

BRIEF DESCRIPTION OF THE DRAWINGS

Other objects, features and advantages of the present invention will become more apparent from the following detailed description when read in conjunction with the accompanying drawings, in which:

FIG. 4 is a block diagram showing a server computer according to an embodiment of the present invention;

DETAILED DESCRIPTION OF THE PREFERRED EMBODIMENTS

Figure 1:
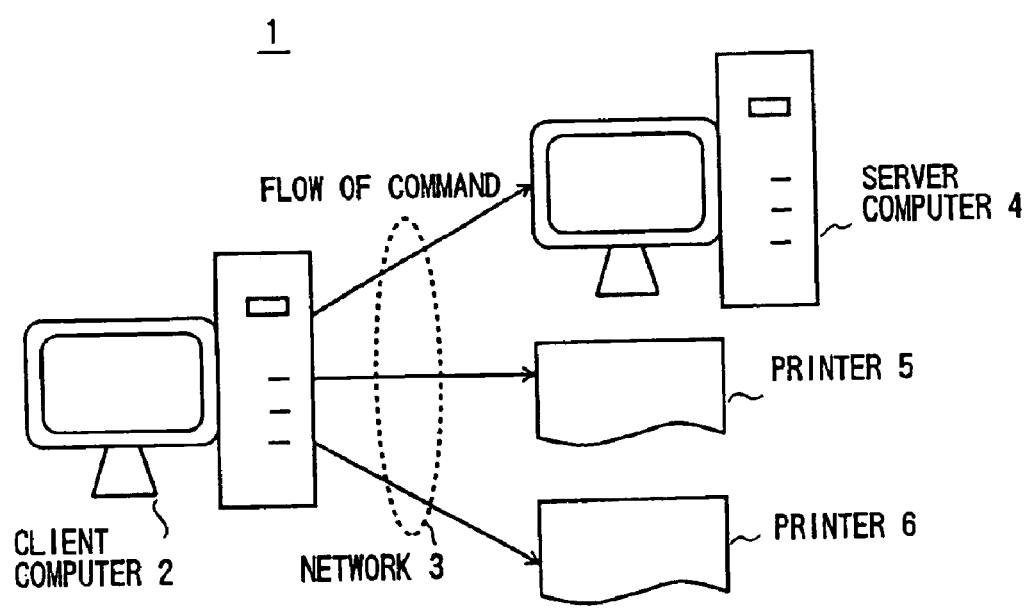
FIG. 1 is a diagram for explaining an example of a conventional information processing system 1.
Figure 2:
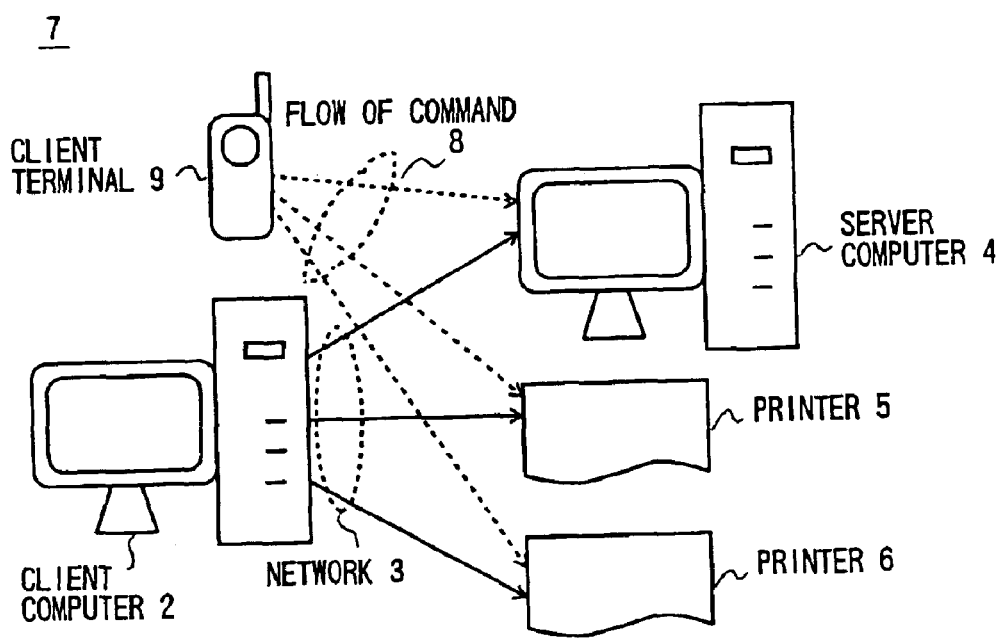
FIG. 2 is a diagram for explaining another example of a conventional information processing system 7.
Figure 3:
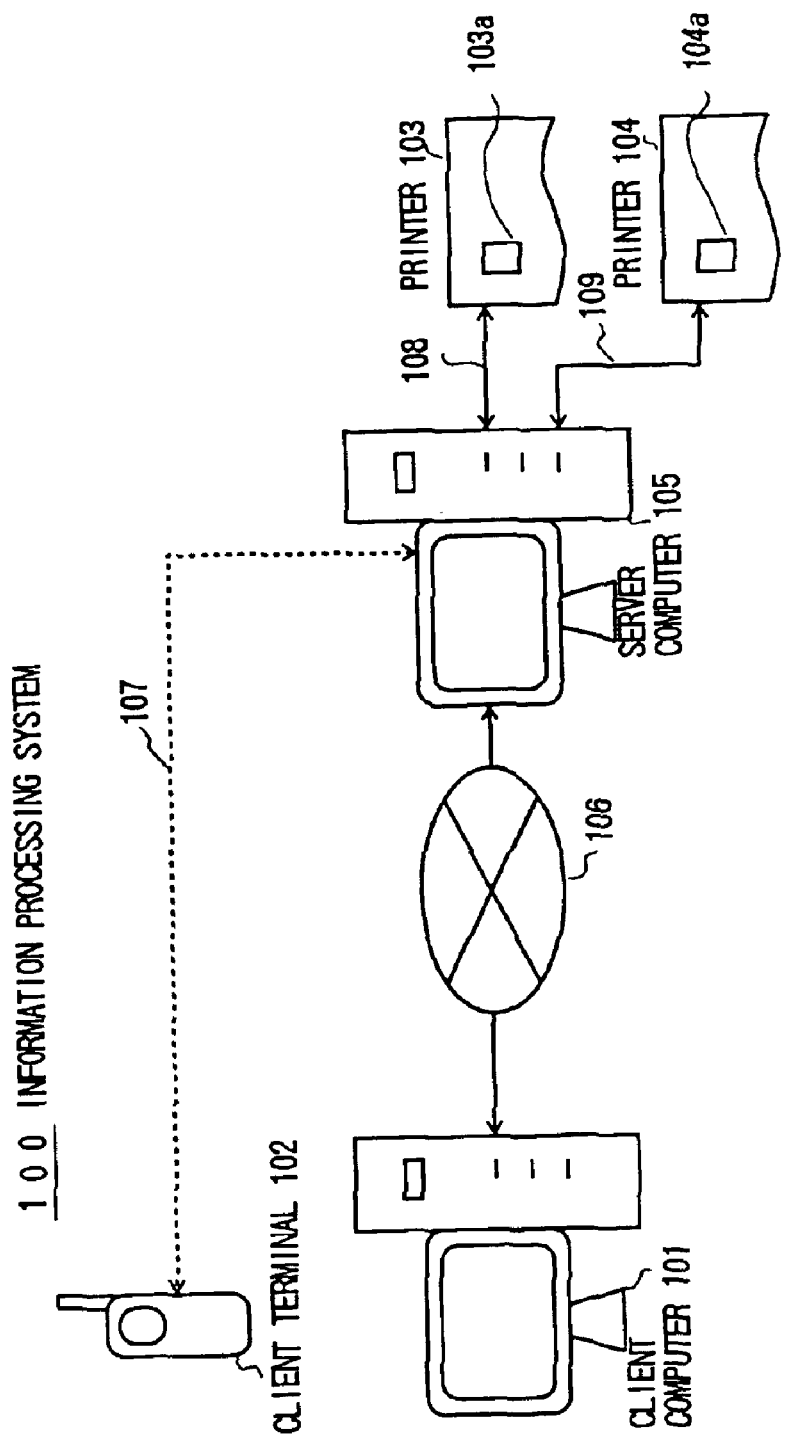
FIG. 3 is a diagram showing a system configuration according to an embodiment of the present invention.

FIG. 3 is a diagram showing a system configuration according to an embodiment of the present invention. An information processing system 100 of the embodiment is configured such that a client computer 101, a client terminal 102 and printers 103, 104 are connected to each other through a server computer 105.

The client computer 101 and the server computer 105 are connected to each other via a telephone network 106. In addition, the client terminal 102 is connected to the server computer 105 via a communication line different from that between the client computer 101 and the server computer 105, which communication line is, for example, a wireless line 107. Further, the printers 103, 104 are connected to the server computer 105, for example, via networks 108, 109 in which the communication types are different from the communication type between the client computer 101 and the server computer 105, and the communication type between the client terminal 102 and the server computer 105.

The client computer 101 operates the printers 103, 104 through the telephone line 106 and the server computer 105 by an operation which will be described later. The client terminal 102 operates the printers 103, 104 through the wireless line 107 and the server computer 105 by an operation which will be described later.

The server computer 105 operates the printers 103, 104 according to commands from the client computer 101 or the client terminal 102.

The printers 103, 104 are connected to each other via the networks 108, 109 and are operated according to commands provided by the server computer 105.

The server computer 105 will be described in detail in the following.

FIG. 4 is a block diagram showing the server computer according to an embodiment of the present invention. The server computer 104 includes receive units 110–113, a central processing unit 114, a file control unit 115, a file device 116, a user interface 117, converters 118–121 and send units 122–125.

The receive unit 110 is connected to the telephone network 106 and receives a signal sent from the client computer 101 through the telephone network 106. In addition, the receive unit 110 sends the signal received from the telephone network 106 to the central processing unit 114 after converting the signal into data which has a predetermined format. The receive unit 111 is connected to the wireless line 107 and receives a signal sent from the client terminal 102 through the wireless line 107. In addition, the receive unit 111 sends the signal received from the wireless line 107 to the central processing unit 114 after converting the signal into data which has a predetermined format.

The receive unit 112 is connected to the network 108 and receives a signal sent from the printer 103 through the network 108. In addition, the receive unit 112 sends the signal received from the network 108 to the central processing unit 114 after converting the signal into data which has a predetermined format. The receive unit 113 is connected to the network 109 and receives a signal sent from the printer 104 through the network 109. In addition, the receive unit 113 sends the signal received from the network 109 to the central processing unit 114 after converting the signal into data which has a predetermined format.

The file control unit 115 and the user interface 117 are connected to the central processing unit 114. The file device 116 is connected to the file control unit 115. The file control unit 115 accesses the file device 116 according to instructions from the central processing unit 114.

The user interface 117 includes a display, a keyboard and a mouse. The user interface 117 displays outputs from the central processing unit 114 and sends requests for processing to the central processing unit 114.

The file device 116 stores command lists 116a, 116b, 116c, . . . used for operating the server computer 105 and the printers 103, 104. The file device 116 reads out the command lists 116a, 116b, 116c, . . . and the like according to instructions from the file control unit 115.

The converter 118 converts data processed in the central processing unit 114 such that the protocol of the data becomes suitable for the client computer 101. The data converted in the converter 118 is supplied to the send unit 122. The send unit 122 supplies the data converted in the converter 118 to the client computer 101 via the telephone network 106.

The converter 119 converts data processed in the central processing unit 114 such that the protocol of the data becomes suitable for the client terminal 102. The data converted in the converter 119 is supplied to the send unit 123. The send unit 123 supplies the data converted in the converter 119 to the client terminal 102 via the wireless line 107.

The converter 120 converts data processed in the central processing unit 114 such that the protocol of the data becomes suitable for the printer 103. The data converted in the converter 120 is supplied to the send unit 124. The send unit 124 supplies the data converted in the converter 120 to the printer 103 via the network 108.

The converter 121 converts data processed in the central processing unit 114 such that the protocol of the data becomes suitable for the printer 104. The data converted in the converter 121 is supplied to the send unit 125. The send unit 125 supplies the data converted in the converter 121 to the printer 104 via the network 109.

In the following, operations when the client computer 101 operates the printers 103 and 104 will be described.

Figure 5:
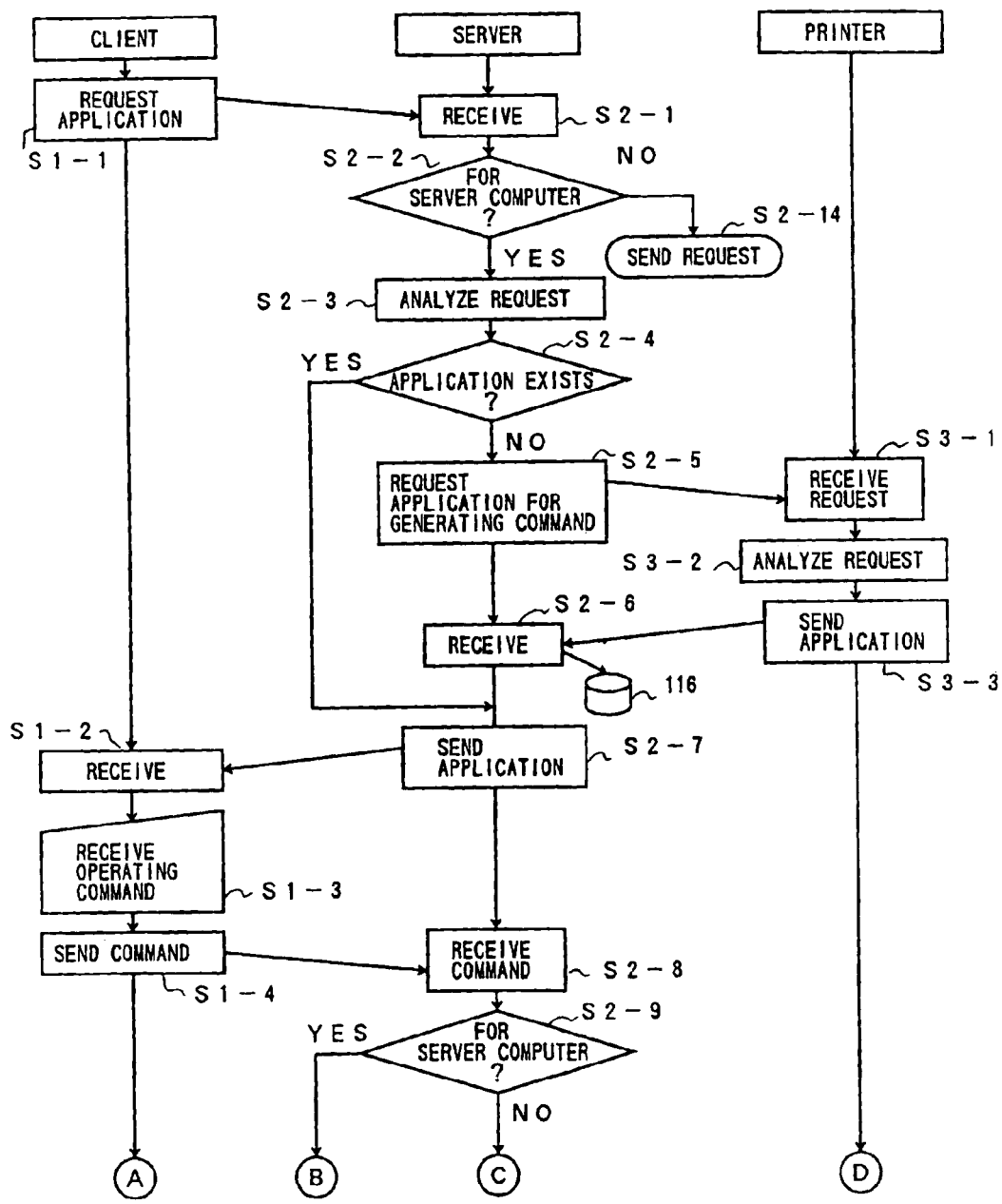
FIG. 5 and FIG. 6 are flowcharts showing operations of a client computer, a server computer and a printer when the client computer operates the printer.
Figure 6:
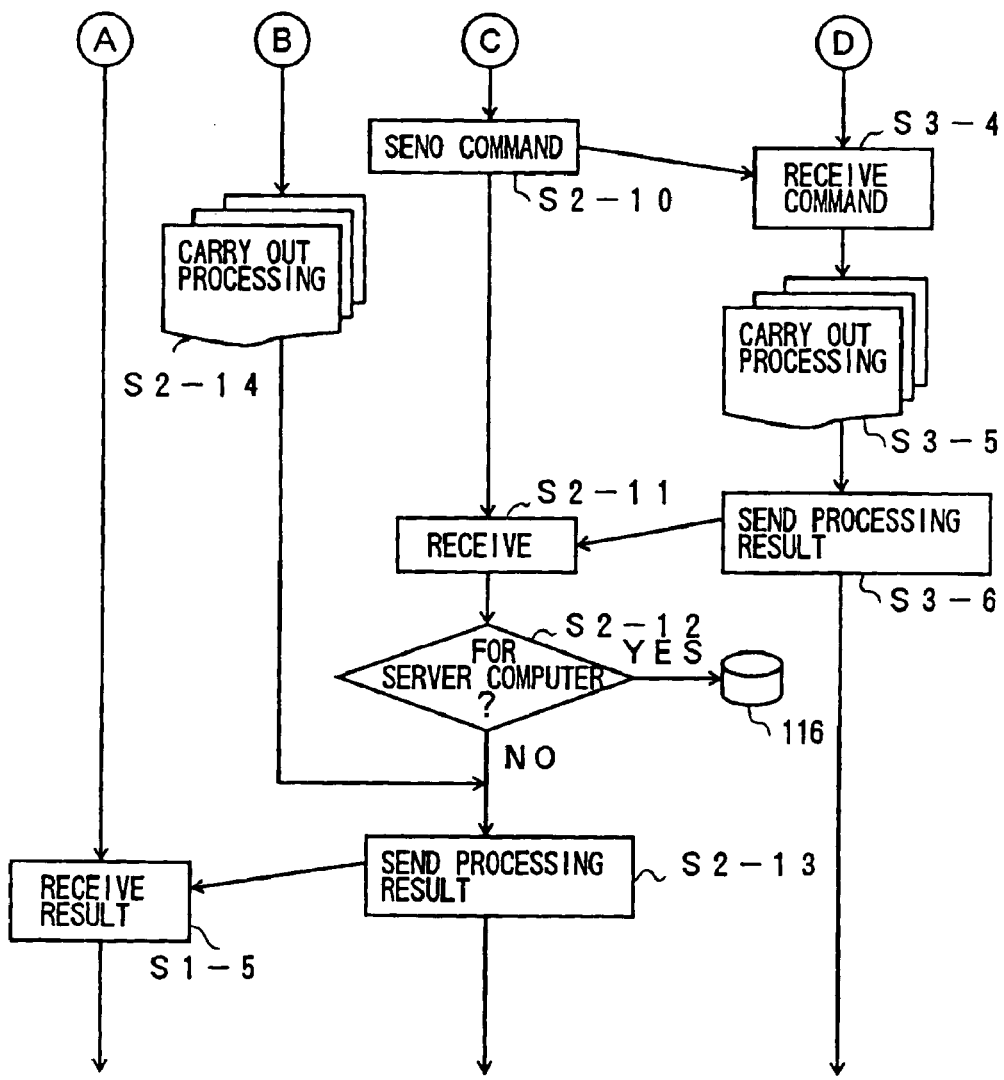

FIG. 5 and FIG. 6 are flowcharts showing the operations of the client computer, the server computer and the printer when the client computer operates the printer.

First, the process of the client computer 101 will be described.

When the client computer 101 receives a command for operating the printer 103, the client computer 101 sends a request for a command list or software of the printer 103 to the server computer 105 by an e-mail in step S1-1. Then, the client computer 101 waits for the command list or the software corresponding to the request. When the client computer 101 receives the command list or the software from the server computer 105 in step S1-2, it becomes possible for the client computer 101 to operate the printer 103.

When the client computer 101 receives an operating command of the printer 103 from a user, the client computer 101 generates a command on the basis of the command list provided by the server computer 105 in the step S1-2 and sends the generated command to the server computer 105 in step S1-4. Then, the client computer 101 waits for a processing result of the command from the server computer 105. The operation of the client computer 101 for operating the printer 103 is completed when receiving the processing result of the printer 103 is received from the server computer 105 in step S1-5.

Next, the process of the server computer 105 will be described.

When the server computer 105 receives the request for the command list and the like from the client computer 101 in step S2-1, the server computer 105 determines whether the request is for the server computer 105 in step S2-2.

When the request is determined to be for the server computer 105 in step S2-2, the request is analyzed in step S2-3.

After analyzing the request, the server computer 105 determines whether the command list or the like corresponding to the request exists in the file device 116 in step S2-4.

When it is determined that the command list or the software corresponding to the request from the client computer 101 does not exist in the file device 116 in step S2-4, the server computer sends a request for the command list to the printer 103 in step S2-5. The server computer 105 stores the command list after receiving the command list from the printer 103 in step S2-6, and sends the command list to the client computer 101 in step S2-7.

Next, when the server computer 105 receives a command generated on the basis of the command list of the printer 103 from the client computer 101 in step S2-8, the server computer 105 determines whether the command is for the server computer 105 in step 2-9.

When it is determined that the command is for the printer 103 in step S2-9, the server computer 105 sends the command provided from the client computer 101 to the printer 103 in step S2-10. When the server computer 105 receives a processing result corresponding to the command sent in step S210 from the printer 103 in step S2-11, the server computer 105 determines whether the result is for the server computer 105 in step S2-12.

When it is determined that the result is for the server computer 105 in step S2-12, the server computer 105 stores the result in the file device 116.

When it is determined that the result is not for the server computer 105, the server computer 105 sends the result to the client computer 101 in step S2-13.

When it is determined that the command is for the server computer 105 in step S2-9, the server computer carries out a process corresponding to the command in step S2-14. Then, the server computer 105 sends the processing result to the client computer 101 in step S2-13.

In addition, when it is determined that the request is not for the server computer 105 in step S2-2, the server computer 105 sends the request to a destination of the request and completes processing in step S2-14.

In the following, the process of the printer 103 will be described.

When the printer 103 receives a request for the command list from the server computer 105 in step S3-1, the printer analyzes the request in step S3-2 and sends the command list, which is stored in the printer 103 beforehand, to the server computer 105 in step S3-3.

When the printer 103 receives the command for the printer 103 from the server computer 105 in step S3-4, the printer 103 carries out processing corresponding to the command in step S3-5 and sends the processing result to the server computer 105 in step S3-6.

In the following, operations when the client computer 101 operates the printer 103 will be described with reference to FIG. 7.

Figure 7:
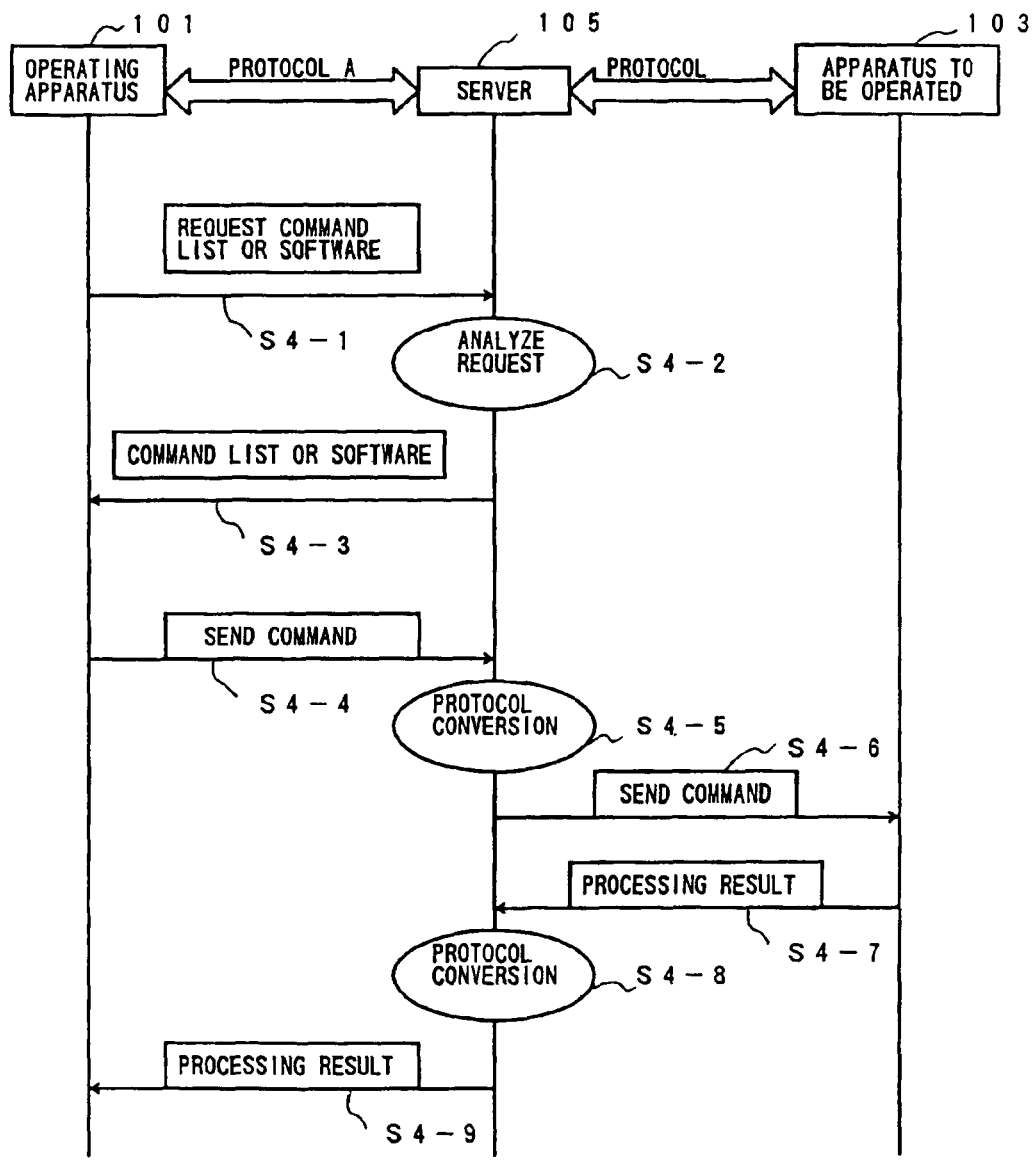
FIG. 7 is a diagram for explaining operations when the client computer operates the printer according to an embodiment of the present invention.

FIG. 7 is a diagram for explaining the operations when the client computer 101 operates the printer 103 according to an embodiment of the present invention.

For example, when the client computer 101 receives a command for operating the printer 103, the client computer 101 sends a request for a command list or software of the printer 103 to the server computer 105 by an e-mail in step S4-1.

When the server computer 105 receives the e-mail from the client computer 101 in step S4-1, the server computer 105 analyzes the request in the e-mail received by the central processing unit 114 in step S4-2. When the central processing unit 114 recognizes that the request is a request for the command list of the printer 103 according to the analysis in step S4-2, the central processing unit 114 makes a request of the file control unit 115 to read the command list 116b of the printer 103 from the file device 116. The file control unit 115 reads the command list 116b of the printer 103 from the file device 116 according to the request from the central processing unit 114, and provides the command list to the central processing unit 114.

When the central processing unit 114 obtains the command list 116b of the printer 103 from the file control unit 115, the central processing unit 114 supplies the command list 116b of the printer 103 to the converter 118. The converter 118 converts the command list 116b of the printer 103 such that the protocol of the command list 116b becomes suitable for the client computer 101, and sends the command list 116b to the send unit 122.

The send unit 122 sends the converted command list 116b to the client computer 101 in step S4-3.

When the client computer 101 receives the command list 116b of the printer 103 from the server computer 105 in step S4-3, the client computer 101 generates a command corresponding to an operation which the printer should be instructed to perform from the command list 116b and sends the command as an e-mail to the server computer 105 in step S4-4.

When the server computer 105 receives the e-mail sent from the client computer 101, the server computer 105 analyzes the command and supplies it to the converter 120 as the command to the printer 103. The converter 120 converts the command such that the protocol of the command becomes suitable for the printer 103 in step S4-5.

The command converted in the converter 120 is supplied to the send unit 124. The send unit 124 supplies the command to the printer 103 via the network 108 in step S4-6.

When the printer 103 receives the command sent from the server computer 105 in step S4-6, the printer 103 carries out a process corresponding to the received command and provides the processing result to the server computer 105 in step S4-7.

When the server computer 105 receives the processing result sent from the printer 103 in step S4-7, the server computer 105 supplies the processing result to the converter 118. The converter 118 converts the processing result from the printer 103 such that the protocol of the result becomes suitable for the client computer 101 in step S4-8.

The processing result which is converted in the converter 118 is supplied to the send unit 122. The send unit 122 sends the converted result to the client computer 101 via the telephone network 106 in step S4-9.

According to the above-mentioned process, the client computer 101 can obtain the processing result corresponding to the command for operating the printer 103 from the printer 103.

According to the embodiment of the present invention, the client computer 101 or the client terminal 102 operates the printer 103 or 104 via the server computer 105.

Therefore, even when communication types of the client computer 101, the client terminal 102 and the printers 103 and 104 are different, the client computer 101, the client terminal 102 and the printers 103 and 104 can be connected only by configuring the server computer 105 such that the server computer 105 supports the communication types. That is, the system can support various communication types easily.

In addition, since the server computer 105 stores command lists and/or software of the printers 103, 104 which are connected, the client computer 101 can operate the printers 103, 104 by supplying the command lists or the software to the client computer 101 as necessary from the server computer 105. Therefore, the client computer 101 or the client terminal 102 does not need to store the command lists or the software. Thus, when an apparatus is added, the apparatus can be connected only by adding a command list or software for the added apparatus to the file device 116 in the server computer 105. Therefore, it becomes easy to add command lists and software.

In addition, even when the command list or the software of the added apparatus does not exist in the file device 116, it is easy to supply the command list or the software to the server computer 105 by storing the command list or the software in storage units 103a, 104a of the printers 103, 104.

In the embodiment, the operations when the client computer 101 operates the printer 103 were described. The present invention can be applicable to the cases when the client computer 101 operates the printer 104 and when the client terminal 102 operates the printers 103, 104 and the like.

In addition, in the embodiment, a configuration in which the client computer 101 and the client terminal 102 operate the printers and the like was described. However, the present invention can be applicable to other apparatuses. Moreover, the communication types are not limited to the telephone network 106 and the wireless line 107. For example, a network which has a firewall can be used. The above-mentioned server computer can be applicable to such a network only by supporting protocols, such as e-mail, ftp, http and the like, which pass through the firewall.

In addition, the apparatus to be operated is not limited to the printers.

Moreover, the command can be issued as the e-mail by converting a protocol in the server computer 105. Therefore, flexibility in operation can be improved.

As mentioned above, according to the present invention, an information processing apparatus such as the server computer stores instruction information of an apparatus to be operated such as the command list and sends the instruction information of the apparatus which an operating apparatus will operate to the operating apparatus according to a request from the operating apparatus. Therefore, the operating apparatus does not need to store the command list of the apparatus to be operated. Since the information processing apparatus manages the command lists, an apparatus to be operated can be added only by adding the command list to the information processing apparatus. Thus, it becomes easy to add and update an apparatus to be operated.

In addition, according to the present invention, when the information processing apparatus does not have instruction information corresponding to the request from the operating apparatus, the instruction information can be obtained from the apparatus to be operated. Thus, the command list is added to the information processing apparatus from the apparatus to be operated automatically according to the request from the operating apparatus. Therefore, it becomes unnecessary to add the command list to the information processing apparatus and the like.

In addition, according to the present invention, the information processing apparatus accommodates difference between communication types of the operating apparatus and the apparatus to be operated. Therefore, it becomes unnecessary to unify the communication types of the information processing apparatus, the operating apparatus and the apparatus to be operated, and various apparatuses which have various communication types can be added so that the flexibility is improved. Moreover, when adding an apparatus, the information processing apparatus only needs to support the communication type of the added apparatus. Therefore, it becomes easy to add an apparatus.

The present invention is not limited to the specifically disclosed embodiments, and variations and modifications may be made without departing from the scope of the invention.

What is claimed is:

1. A server to which an operating client and a peripheral apparatus to be operated by said operating client are connected, said server functioning as a peripheral server with which the operating client operates the peripheral apparatus, the server comprising:

an instruction information storing port which stores a set of operating instructions to be used by said client apparatus to operate the peripheral apparatus via the server:

an instruction information send part which reads said set of operating instructions from said instruction information storing part in response to a request from said operating client and in further response sends said set of operating instructions to aid operating client, where the request is sent by the operating client in automatic response to an operating command, at the operating client, to operate the peripheral apparatus;

a client communicating part which sends said set of operating instructions to said operating client and which receives from the lent command instructions for the operating command and made with the sent set of operating instructions; and a peripheral communicating part which sends the command instructions received from said operating client via said communicating part to said peripheral apparatus and receives from said peripheral apparatus processing results of said peripheral apparatus performing the command instructions;

wherein said client communicating send part sends the processing results received from said peripheral apparatus to said operating client.

2. The server as claimed in claim 1, further comprising an operating instruction information obtaining part which obtains said operating instructions from said peripheral apparatus when said operating instruction information storing part does not have said operating instructions corresponding to said request.

3. The information processing apparatus as claimed in claim 1, further comprising a communication protocol accommodation part which accommodates a difference between communication protocols of said client and said peripheral apparatus to be operated by said operating client.

4. The information processing apparatus as claimed in claim 3, wherein said communication protocol accommodation part includes a converter which converts data such that a protocol of said data becomes suitable for said communication protocols.

5. The information processing apparatus as claimed in claim 1, wherein said peripheral apparatus to be operated comprises a printer.

6. An information processing method of a server to which an operating client and a peripheral apparatus to be operated by said operating client are connected, said method of the server comprising:

receiving from said operating client a request to operate said peripheral apparatus, where the request is automatically sent from the client when the client receives a request to operate the peripheral apparatus;

sending operating instructions to be used by said client apparatus to operate the peripheral apparatus from said server to said operating client in response to said request to operate said peripheral apparatus;

receiving from said operating client instructions to perform the operation requested at the client, where the instructions are based on the operating instructions received by the client;

sending the instructions received from said operating client to the peripheral apparatus designated by the operating client;

receiving from the peripheral apparatus processing results of said peripheral apparatus performing said operating instructions; and sending the processing results received from the peripheral apparatus to the operating client.

7. The information processing method as claimed in claim 6, wherein said sending comprises obtaining said operating instructions from said peripheral apparatus to be operated when said server does not have said operating instructions corresponding to said request.

8. A computer readable medium storing information for causing a server computer system to perform a process, an operating client and a peripheral apparatus to be operated by said operating client being connected to said server computer system, said process comprising:

receiving from said operating client a request to operate said peripheral apparatus, where the request is automatically sent from the client when the client receives a request to operate the peripheral apparatus;

sending operating instructions to be used by said client apparatus to operate the peripheral apparatus from said server computer system to said operating client in response to said request to operate said peripheral apparatus;

receiving from said operating client instructions to perform the operation requested at the client, where the instructions are based on the operating instructions received by the client;

sending the instructions received from said operating client to the peripheral apparatus designated by the operating client;

receiving from the peripheral apparatus processing results of the peripheral apparatus performing the operating instructions; and sending the processing results received from the peripheral apparatus to the operating client.

9. The computer readable medium as claimed in claim 8, wherein said process further comprises obtaining said operating instructions from said peripheral apparatus when said server computer system does not have said operating instructions corresponding to said request.

10. An apparatus according to claim 1, wherein the server is adapted to communicate with the client via a first network by using a first protocol and to communicate with the peripheral apparatus via a second network by using a second protocol.

11. An apparatus according to claim 10, wherein the server is adapted to facilitate shared operation of the peripheral apparatus by multiple clients.

12. A method, comprising:

managing and storing, at a server connected to a client, a list of software commands for operating a peripheral device;

at a client, responding to a user command to operate the peripheral device by requesting for the server the software command list and then generating an operating command for performing the requested operating, where the generating is on the basis of the command list received from the server;

sending the generated operating command from the client to the server, which in response sends the operating command to the peripheral device; and using an e-mail to perform the sending.

13. A method of distributing printer instructions on a network, the method comprising:

at a client, starting a print job destined for a network printer over a network by sending from the client over the network a request to operate the network printer, where the request is formatted according to a first protocol;

receiving the request at a server and in response sending to the client a command list specific to the network printer and for operating the network printer, receiving the command list at the client;

continuing the print job at the client by preparing a printer command based on the received command list and sending the printer command on the network, where the printer command is formatted according to the first protocol;

receiving the printer command at the server and in response sending the printer command to the network printer in a format according to a second protocol;

receiving the printer command at the network printer and operating according to the command and in response sending to the server indicia of ending the operating formatted according to the second protocol; and receiving the indicia at the server and sending the indicia to the client formatted according to the first protocol.

14. A method of distributing different command lists for operating respective differently-operated peripheral devices on a network, the method comprising:

at clients, initiating operations of the peripheral devices over a network by sending, over the network, requests related to operating the peripheral devices, where the peripheral devices are each operated by different sets of commands corresponding to the command lists, and the command lists are for operating the respective differently-operated peripheral devices;

receiving the requests at a server and in response sending to the clients, respectively, command lists corresponding to the respective requested peripheral devices, where the server serves handles shared operation of the peripheral devices by the clients;

receiving the command lists at the respective clients;

continuing the operations of the peripheral devices at the clients by preparing respective different operating commands based on the respective received command lists, and sending the operating commands on the network;

receiving the different operating commands at the server and in response sending the operating commands to the respective peripheral devices;

receiving the different operating commands at the respective differently-operated peripheral devices and the peripheral devices responding by operating accordingly and sending a report of operation;

receiving the report of operation from each of the respective peripheral devices at the server and the server sending the report of operation to the client send the operating command; and receiving a report of operation at the client respectively.

* * * * *

UNITED STATES PATENT AND TRADEMARK OFFICE
CERTIFICATE OF CORRECTION

PATENT NO. : 6,868,455 B1
DATED : March 15, 2005
INVENTOR(S) : Kota Ariyama

It is certified that error appears in the above-identified patent and that said Letters Patent is hereby corrected as shown below:

Column 8,
Line 26, change "port" to -- part --.
Line 29, change ":" to -- ; --.
Line 34, change "aid" to -- said --.
Line 40, change "lent" to -- client --.
Line 48, change ";" to -- , --.

Column 10,
Line 14, change "operating" to -- operation --.
Line 30, change "," to -- ; --.

Signed and Sealed this

Seventh Day of February, 2006

JON W. DUDAS
*Director of the United States Patent and Trademark Office*